(12) United States Patent
Endo et al.

(10) Patent No.: US 8,334,054 B2
(45) Date of Patent: *Dec. 18, 2012

(54) HEAT CONDUCTIVE CURED PRODUCT AND MAKING METHOD

(75) Inventors: Akihiro Endo, Annaka (JP); Masaya Asaine, Annaka (JP); Takahiro Maruyama, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/918,528

(22) PCT Filed: Feb. 20, 2009

(86) PCT No.: PCT/JP2009/053626
§ 371 (c)(1),
(2), (4) Date: Aug. 20, 2010

(87) PCT Pub. No.: WO2009/107757
PCT Pub. Date: Sep. 3, 2009

(65) Prior Publication Data
US 2011/0024675 A1 Feb. 3, 2011

(30) Foreign Application Priority Data
Feb. 29, 2008 (JP) ................. 2008-050276

(51) Int. Cl.
*B32B 9/04* (2006.01)
(52) U.S. Cl. .......... 428/447; 524/437; 524/441; 528/15; 525/476
(58) Field of Classification Search .......... 428/447; 524/437, 441; 528/15; 525/478
See application file for complete search history.

(56) References Cited

U.S. PATENT DOCUMENTS

| | | | | |
|---|---|---|---|---|
| 5,061,559 A * | 10/1991 | Ogusi et al. | ................. | 428/343 |
| 5,932,145 A | 8/1999 | Mitani et al. | | |
| 6,884,314 B2 * | 4/2005 | Cross et al. | ................. | 156/329 |
| 7,527,830 B2 | 5/2009 | Asaine | | |
| 2004/0043229 A1 * | 3/2004 | Aoki et al. | ................. | 428/446 |
| 2006/0154087 A1 | 7/2006 | Asaine | | |
| 2008/0254247 A1 * | 10/2008 | Asaine | ................. | 428/40.9 |

FOREIGN PATENT DOCUMENTS

| | | |
|---|---|---|
| EP | 0 839 870 | 5/1998 |
| EP | 1 675 174 | 6/2006 |
| JP | 2005 35264 | 2/2005 |
| JP | 2005 206733 | 8/2005 |
| JP | 2006 182888 | 7/2006 |
| JP | 2006 188610 | 7/2006 |

* cited by examiner

*Primary Examiner* — Margaret Moore
(74) *Attorney, Agent, or Firm* — Oblon, Spivak, McClelland, Maier & Neustadt, L.L.P.

(57) ABSTRACT

A heat conductive cured product which can be handled even in a single layer or thin film form, can be readily attached to a heat-generating component or heat-dissipating member, and exhibits an appropriate tack and heat conductivity in a thin film form is provided as well as a method for preparing the same. A heat conductive cured product is prepared by applying a heat conductive composition as a thin film to a substrate which has been treated to have a silicone pressure-sensitive adhesive releasable surface, and curing the composition, the composition comprising as essential components, (a) an organopolysiloxane having alkenyl radicals, (b) a heat conductive filler, the filler containing at least 30 vol % of aluminum powder based on its total volume, (c) an organohydrogenpolysiloxane, (d) a platinum group metal catalyst, (e) a reaction regulator, and (f) a silicone resin.

16 Claims, 1 Drawing Sheet

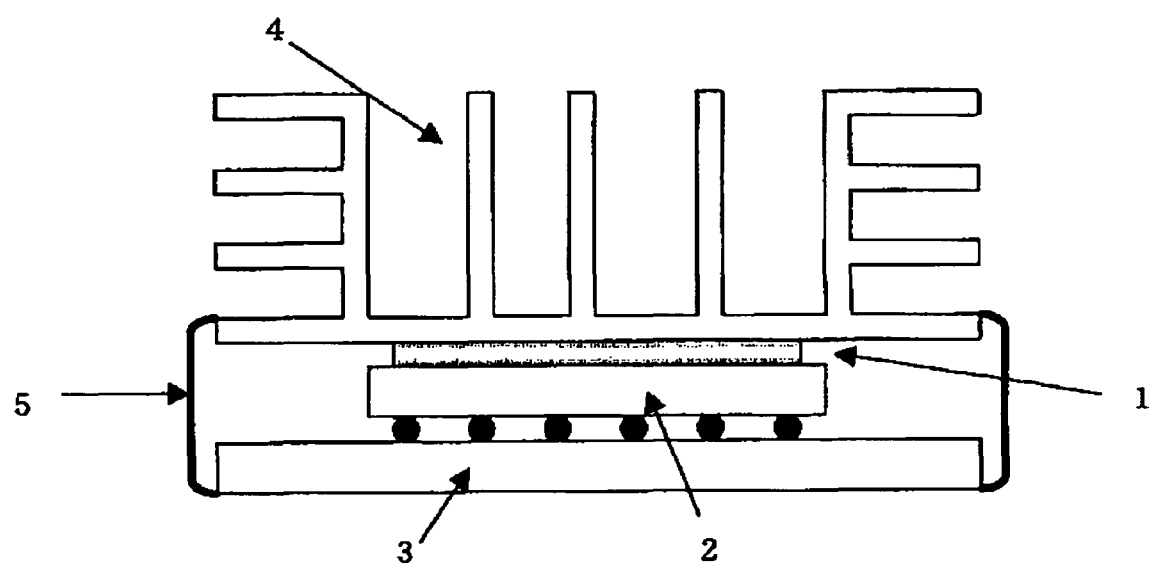

HEAT CONDUCTIVE CURED PRODUCT AND MAKING METHOD

TECHNICAL FIELD

This invention relates to a heat conductive cured product adapted to be inserted between a thermal boundary of a heat-generating component and a heat dissipating member (e.g., heat sink or circuit board) for cooling the heat-generating component, and a method for preparing the cured product.

BACKGROUND ART

LSI chips such as CPU, driver IC and memories and light-emitting devices such as LED are used in electronic equipment such as personal computers, DVD units, and mobile phones. As these electronic components are tailored for higher performance, higher speed of operation, size reduction and higher integration, they themselves generate greater amounts of heat. Elevated temperatures of the components by their own heat cause malfunction and failure to the components themselves. To suppress a temperature rise of heat-generating components during operation, many heat-dissipating means and heat-dissipating members used therefore have been proposed.

In prior art electronic equipment, heat-dissipating members, typically heat sinks in the form of metal plates of aluminum or copper having a high heat conductivity are used for suppressing a temperature rise of heat-generating components during operation. The heat-dissipating member conducts the heat generated by the heat-generating component and releases the heat from the member surface by virtue of a temperature difference from the ambient air.

For efficient conduction of the heat generated by the heat-generating component to the heat-dissipating member, it is effective to fill a small gap between the component and the member with a heat conductive material. The heat conductive materials used include heat conductive sheets and heat conductive grease having heat conductive fillers laden. Such a heat conductive material is interposed between the heat-generating component and the heat-dissipating member, thereby establishing a way for heat conduction from the heat-generating component to the heat-dissipating member via the heat conductive material.

Since sheets are easier to handle than grease, heat conductive sheets made of heat conductive silicone rubber or the like are used in a variety of applications. The heat conductive sheets are generally divided into two categories, general-purpose sheets which are selected for ease of handling and low-hardness sheets which are selected for adhesion.

Of these, the general-purpose sheets are, for the most part, made of hard rubbers having a hardness of at least 60 in Type A Durometer hardness unit. Even sheets in thin-film form as thin as about 0.1 mm can be handled individually, but are difficult to attach to heat-generating components or heat-dissipating members because they lack surface tack. One solution to this problem is a surface-tackified sheet. Specifically, a pressure-sensitive adhesive is applied to one or both surfaces of a thin heat-conductive sheet so that it may be readily attached to an object. However, since the pressure-sensitive adhesive applied is not fully heat conductive, the pressure-sensitive adhesive-coated sheet undesirably has a significantly increased thermal resistance as compared with the uncoated sheet. In addition, the coating of pressure-sensitive adhesive becomes a buildup of sheet thickness and also adversely affects the thermal resistance from this aspect.

On the other hand, the low-hardness sheets are formed from low-hardness heat-conductive materials having a hardness of less than 60 in Asker C hardness unit. These sheets inherently have a sufficient degree of tack to attach them to any object without a need for pressure-sensitive adhesive or the like. However, since the low hardness is accomplished by loading the material with a large amount of plasticizer or effecting crosslinking only to a low degree, a sheet formed from the material into a thin film form lacks strength and handling. The sheet must have a thickness above a certain level in order to facilitate handling. It is then difficult to reduce the thermal resistance of low-hardness sheets. In addition, the low-hardness sheets have an undesired tendency of oil bleeding to contaminate adjacent heat-generating components.

One proposal made to overcome these drawbacks is a pressure-sensitive adhesive tape which may be handled even in a single layer or thin film form and has sufficient tack to readily attach it to a heat-generating component or heat-dissipating member. However, as modern heat-generating components generate increasingly greater amounts of heat, ordinary pressure-sensitive adhesive tapes can no longer afford a sufficient heat-dissipating capacity. The heat-dissipating capacity may be enhanced by such means as a heavy loading of heat conductive filler. The heavy loading of heat conductive filler, however, raises the problem that the pressure-sensitive adhesive tape itself becomes brittle and inconvenient to use.

The patent documents relating to the present invention are listed below.

CITATION LIST

Patent Document 1: JP-A 2005-035264
Patent Document 2: JP-A 2005-206733
Patent Document 3: JP-A 2006-182888
Patent Document 4: JP-A 2006-188610

DISCLOSURE OF THE INVENTION

An object of the invention is to provide a heat conductive cured product which can be handled even in a single layer or thin film form, can be readily attached to any heat-generating component or heat-dissipating member, and exhibits an appropriate tack and heat conductivity even in a thin film form; and a method for preparing the same.

Making extensive investigations to attain the above and other objects, the inventors have found that a heat conductive cured product is obtained by compounding a heat-conductive filler in a silicone rubber composition of the addition reaction cure type, compounding a silicone resin therein, applying the composition as a thin film to a substrate which has been treated to have a silicone pressure-sensitive adhesive releasable surface, and curing the composition; that the heat conductive cured product has excellent surface tack, controlled bleeding, easy peeling from the substrate, and ease of handling after peeling, as will be demonstrated in Examples, so that when interposed between a heat-generating component and a heat-dissipating member, it serves as an effective heat transfer member for conducting the heat from the heat-generating component to the heat-dissipating member.

Particularly when the heat conductive filler contains at least 30% by volume of aluminum powder having an average particle size of 0.1 to 100 μm, the resulting heat conductive cured product has a high heat conductivity and hence an outstanding heat-dissipating capability.

Accordingly, the invention provides a heat conductive cured product and a method for preparing the same, as defined below.

[Claim 1]

A heat conductive cured product prepared by applying a heat conductive composition as a thin film to a substrate which has been treated to have a silicone pressure-sensitive adhesive releasable surface, and curing the composition, said composition comprising as essential components,
- (a) 100 parts by volume of an organopolysiloxane having alkenyl radicals,
- (b) 50 to 1,000 parts by volume of a heat conductive filler, the filler containing at least 30% by volume of aluminum powder based on the total volume of the filler,
- (c) an organohydrogenpolysiloxane in an amount to give a molar ratio of silicon-bonded hydrogen atoms in component (c) to alkenyl radicals in component (a) between 0.5 and 5.0,
- (d) a catalytic amount of a platinum group metal catalyst,
- (e) an effective amount of a reaction regulator, and
- (f) 50 to 500 parts by volume of a silicone resin.

[Claim 2]

The heat conductive cured product of claim 1 wherein the silicone resin (f) comprises $R^1{}_3SiO_{1/2}$ units and $SiO_{4/2}$ units wherein $R^1$ is a substituted or unsubstituted monovalent hydrocarbon radical free of aliphatic unsaturation, a molar ratio of $R^1{}_3SiO_{1/2}$ units to $SiO_{4/2}$ units being between 0.5 and 1.5.

[Claim 3]

The heat conductive cured product of claim 1 or 2 wherein said heat conductive composition further comprises (g-1) 0.01 to 50 parts by volume of an alkoxysilane compound having the general formula (1):

$$R^2{}_aR^3{}_bSi(OR^4)_{4-a-b} \quad (1)$$

wherein $R^2$ is each independently $C_6$-$C_{15}$ alkyl, $R^3$ is each independently a substituted or unsubstituted, monovalent $C_1$-$C_8$ hydrocarbon radical, $R^4$ is each independently $C_1$-$C_6$ alkyl, "a" is an integer of 1 to 3, "b" is an integer of 0 to 2, a+b is an integer of 1 to 3, and/or (g-2) 0.01 to 50 parts by volume of a dimethylpolysiloxane capped with a trialkoxysilyl radical at one end of the molecular chain, having the general formula (2):

$$(2)$$

wherein $R^5$ is each independently $C_1$-$C_6$ alkyl, and "c" is an integer of 5 to 100.

[Claim 4]

The heat conductive cured product of any one of claims 1 to 3 wherein said heat conductive composition further comprises (h) an organopolysiloxane having the general formula (3):

$$R^6{}_dSiO_{(4-d)/2} \quad (3)$$

wherein $R^6$ is each independently a monovalent $C_1$-$C_{18}$ hydrocarbon radical, and "d" is a number of 1.8 to 2.2, said organopolysiloxane having a kinematic viscosity of 10 to 100,000 mm$^2$/s at 25° C.

[Claim 5]

The heat conductive cured product of any one of claims 1 to 4 wherein the cured product has a thickness of 20 to 1,000 μm.

[Claim 6]

The heat conductive cured product of any one of claims 1 to 5, having a heat conductivity of at least 1.5 W/m-K as measured at 25° C. by laser flash analysis.

[Claim 7]

The heat conductive cured product of any one of claims 1 to 6 wherein the substrate has been treated with a release agent to be silicone pressure-sensitive adhesive releasable, said release agent being a modified silicone having fluorinated substituent radicals within its main chain.

[Claim 8]

A method for preparing a heat conductive cured product, comprising the steps of applying a heat conductive composition as a thin film to a substrate which has been treated to have a silicone pressure-sensitive adhesive releasable surface, and curing the composition, said composition comprising as essential components,
- (a) 100 parts by volume of an organopolysiloxane having alkenyl radicals,
- (b) 50 to 1,000 parts by volume of a heat conductive filler, the filler containing at least 30% by volume of aluminum powder based on the total volume of the filler,
- (c) an organohydrogenpolysiloxane in an amount to give a molar ratio of silicon-bonded hydrogen atoms in component (c) to alkenyl radicals in component (a) between 0.5 and 5.0,
- (d) a catalytic amount of a platinum group metal catalyst,
- (e) an effective amount of a reaction regulator, and
- (f) 50 to 500 parts by volume of a silicone resin.

As used herein, the term "parts by volume" of a substance is computed by dividing its weight (or mass) by its theoretical specific gravity (or true specific gravity).

ADVANTAGEOUS EFFECTS OF INVENTION

The heat conductive cured product of the invention can be smoothly peeled from the substrate, is easy to handle even in a single layer or thin film form, and has a sufficient tack to attach it to a heat-generating component or heat-dissipating member. In addition, it is in close contact with the heat-generating component or heat-dissipating member and has a high heat conductivity. It thus displays an excellent heat-dissipating capability.

BRIEF DESCRIPTION OF DRAWINGS

FIG. 1 is a schematic cross-sectional elevation view of a heat-generating/dissipating assembly into which the heat conductive cured product of the invention is incorporated.

DESCRIPTION OF EMBODIMENTS

The silicone rubber composition from which the heat conductive cured product of the invention is prepared contains as essential components, (a) an organopolysiloxane having alkenyl radicals, (b) a heat conductive filler containing at least 30% by volume based on its total volume of aluminum powder, (c) an organohydrogenpolysiloxane, (d) a platinum group metal catalyst, (e) a reaction regulator, and (f) a silicone resin.

Component (a) is an organopolysiloxane having alkenyl radicals, specifically an organopolysiloxane having at least two alkenyl radicals each attached to a silicon atom in a molecule. It is a base polymer in the addition reaction cure system.

The molecular structure of organopolysiloxane is not limited as long as it is liquid. For example, the organopolysiloxane may have a linear, branched, or partially branched linear structure, with the linear structure being preferred. The alkenyl radicals are typically those of 2 to 8 carbon atoms, for example, vinyl, allyl, propenyl, isopropenyl, butenyl, hexenyl, and cyclohexenyl. Inter alia, lower alkenyl radicals such as vinyl and allyl are preferred, with vinyl being most preferred. The alkenyl radicals may be attached to any of silicon atoms at the ends of the molecular chain and silicon atoms midway the molecular chain. It is preferred that alkenyl radicals be included as being attached to only the silicon atoms at the molecular chain ends because the cured product becomes more flexible.

Silicon-bonded radicals other than alkenyl radicals in component (a) are typically substituted or unsubstituted monovalent hydrocarbon radicals, specifically those of 1 to 10 carbon atoms, and more specifically 1 to 6 carbon atoms, for example, alkyl radicals such as methyl, ethyl, propyl, isopropyl, butyl, isobutyl, tert-butyl, pentyl, neopentyl, hexyl, heptyl, octyl, nonyl, decyl and dodecyl, cycloalkyl radicals such as cyclopentyl, cyclohexyl and cycloheptyl, aryl radicals such as phenyl, tolyl, xylyl, naphthyl and biphenylyl, aralkyl radicals such as benzyl, phenylethyl, phenylpropyl and methylbenzyl, and substituted forms of the foregoing in which some or all carbon-bonded hydrogen atoms are substituted by halogen atoms such as fluorine, chlorine and bromine, cyano radicals or the like, e.g., chloromethyl, 2-bromoethyl, 3-chloropropyl, 3,3,3-trifluoropropyl, chlorophenyl, fluorophenyl, cyanoethyl, and 3,3,4,4,5,5,6,6-nonafluorohexyl. Of these, preference is given to substituted or unsubstituted $C_1$-$C_3$ alkyl radicals such as methyl, ethyl, propyl, chloromethyl, bromoethyl, 3,3,3-trifluoropropyl, and cyanoethyl, and substituted or unsubstituted phenyl radicals such as phenyl, chlorophenyl and fluorophenyl. All silicon-bonded radicals other than alkenyl radicals may be identical or different. Most often, methyl is selected for all these radicals for several reasons including cost, availability, chemical stability and environmental load unless special properties like solvent resistance are required.

The organopolysiloxane typically has a kinematic viscosity at 25° C. of 10 to 100,000 $mm^2$/s and preferably 500 to 50,000 $mm^2$/s. If the viscosity is too low, the resulting composition may lose storage stability. If the viscosity is too high, the resulting composition may be less stretchable. As used herein, the kinematic viscosity is measured at 25° C. by an Ostwald viscometer (true throughout the specification).

Preferred examples of the organopolysiloxane include dimethylvinylsiloxy-terminated polydimethylsiloxane, methyldivinylsiloxy-terminated polydimethylsiloxane, and dimethylvinylsiloxy-terminated dimethylsiloxane-methylphenylsiloxane copolymers. As used herein, the term "terminated" means that the polysiloxane is capped at both ends of its molecular chain with the indicated groups.

The organopolysiloxane as component (a) may be used alone or in a mixture of two or more species, for example, having different viscosity.

Component (b) is a heat conductive filler. Use may be made of materials generally known as the heat conductive filler, including metal powders, metal oxide powders, metal nitride powders, carbon based powders, and ceramic powders. Illustrative examples of the heat conductive filler include aluminum powder, copper powder, silver powder, nickel powder, gold powder, metal silicide powder, aluminum oxide powder, zinc oxide powder, magnesium oxide powder, iron oxide powder, titanium oxide powder, zirconium oxide powder, aluminum nitride powder, boron nitride powder, silicon nitride powder, diamond powder, carbon powder, fullerene powder, and carbon graphite powder. The filler may be used alone or in a mixture of two or more species.

The heat conductive filler used herein preferably has an average particle size of 0.1 to 100 μm, and more preferably 0.5 to 50 μm. It is acceptable to use a mixture of two or more powders having different average particle size. As used herein, the "average particle size" is a volume average particle size as measured by a particle size distribution analyzer Microtrac® MT3300EX (Nikkiso Co., Ltd.).

In the invention, the heat conductive filler as component (b) should contain at least 30% by volume, preferably 40% to 100% by volume of aluminum powder based on the total volume of the filler. Since aluminum has a high heat conductivity of 237 W/m-K, the heat conductive cured product is increased in heat conductivity by incorporating aluminum therein. Since aluminum is also characterized by a low specific gravity of 2.7, little sedimentation occurs in a heat conductive composition prior to curing into the heat conductive cured product. Therefore, when the heat conductive composition is applied and cured, the heat conductive filler is uniformly distributed in the heat conductive cured product without segregation, which is one of the factors capable of enhancing the heat conduction of the cured product. The aluminum powder may be used alone or in a combination of two or more species, for example, having different particle size or shape. If the aluminum powder accounts for less than 30% by volume based on the total volume of the heat conductive filler (b), it is then difficult to endow the heat conductive cured product with the desired high heat conductivity. Particularly when the heat conductive filler which contains at least 30% by volume based on the total volume of the filler of an aluminum powder having an average particle size of 0.1 to 100 μm, especially 0.5 to 50 μm is used as component (b), the resulting heat conductive cured product has a high heat conductivity and displays an outstanding heat-dissipating capability.

The heat conductive filler is compounded in an amount of 50 to 1,000 parts, and preferably 100 to 500 parts by volume per 100 parts by volume of component (a). Outside the range, a composition containing a larger amount of filler is less flowable, and difficult to apply or mold whereas a composition containing a less amount of filler has a less than desired heat conductivity.

In the composition, component (c) is an organohydrogenpolysiloxane, preferably having at least two, more preferably 2 to 100 silicon-bonded hydrogen atoms (i.e., SiH radicals) in a molecule. It serves as a crosslinker for component (a). Specifically, silicon-bonded hydrogen atoms in component (c) add to alkenyl groups in component (a) through hydrosilylation reaction in the presence of a platinum group metal catalyst as component (d), yielding a crosslinked cured product of three-dimensional network structure having crosslinks.

Silicon-bonded organic radicals in component (c) are, for example, substituted or unsubstituted monovalent hydrocarbon radicals other than alkenyl radicals, examples of which are the same as the silicon-bonded organic radicals other than alkenyl exemplified in conjunction with component (a). Inter alia, methyl is preferred from the standpoints of synthesis and cost.

The structure of organohydrogenpolysiloxane as component (c) is not particularly limited. It may have a linear, branched or cyclic structure, with the linear structure being preferred.

Examples of the organohydrogenpolysiloxane as component (c) include those of the general formula (4):

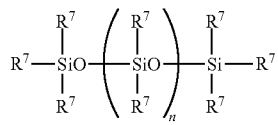

(4)

wherein $R^7$ is each independently hydrogen or a substituted or unsubstituted monovalent hydrocarbon radical other than alkenyl, at least two $R^7$ are hydrogen, and n is a positive number of at least 1.

In formula (4), the substituted or unsubstituted monovalent hydrocarbon radicals (other than alkenyl) represented by $R^7$ are the same as the monovalent hydrocarbon radicals included in the silicon-bonded organic radicals (other than alkenyl) exemplified in conjunction with component (a). The subscript n is preferably a positive number of 2 to 100, and more preferably 5 to 50.

Preferred examples of the organohydrogenpolysiloxane as component (c) include trimethylsiloxy-terminated methylhydrogenpolysiloxane, trimethylsiloxy-terminated dimethylsiloxane-methylhydrogensiloxane copolymers, trimethylsiloxy-terminated dimethylsiloxane-methylhydrogensiloxane-methylphenylsiloxane copolymers, dimethylhydrogensiloxy-terminated dimethylpolysiloxane, dimethylhydrogensiloxy-terminated dimethylsiloxane-methylhydrogensiloxane copolymers, dimethylhydrogensiloxy-terminated dimethylsiloxane-methylphenylsiloxane copolymers, and dimethylhydrogensiloxy-terminated methylphenylpolysiloxane. Notably, the organohydrogenpolysiloxane as component (c) may be used alone or in a combination of two or more.

Component (c) is added in an amount to give 0.5 to 5.0 moles, desirably 0.8 to 4.0 moles of SiH radicals in component (c) per mole of alkenyl radicals in component (a). If the amount of SiH radicals in component (c) is less than 0.5 mole per mole of alkenyl radicals in component (a), problems arise that the heat conductive composition does not cure and the cured product has an insufficient strength to handle as a molded part or laminate. If the amount of SiH radicals is more than 5.0 moles, a problem arises that the cured product has an insufficient tack to attach itself in place by its own adhesiveness.

Component (d) is a platinum group metal catalyst. The catalyst promotes the addition reaction between alkenyl radicals in component (a) and silicon-bonded hydrogen atoms in component (c) for producing a crosslinked cured product of three-dimensional network structure from the composition.

Component (d) includes a number of well-known catalysts for use in ordinary hydrosilylation reaction. Exemplary catalysts include elemental platinum group metals such as platinum (inclusive of platinum black), rhodium, and palladium; platinum chlorides, chloroplatinic acid and chloroplatinic acid salts such as $H_2PtCl_4.nH_2O$, $H_2PtCl_6.nH_2O$, $NaHPtCl_6.nH_2O$, $KHPtCl_6.nH_2O$, $Na_2PtCl_6.nH_2O$, $K_2PtCl_4.nH_2O$, $PtCl_4.nH_2O$, $PtCl_2$, and $Na_2HPtCl_4.nH_2O$ wherein n is an integer of 0 to 6, and preferably 0 or 6; alcohol-modified chloroplatinic acid, complexes of chloroplatinic acid with olefins; platinum group metals such as platinum black and palladium on supports such as alumina, silica and carbon; rhodium-olefin complexes, chlorotris(triphenylphosphine)-rhodium (known as Wilkinson catalyst); and complexes of platinum chlorides, chloroplatinic acid and chloroplatinic acid salts with vinyl-containing siloxanes. The platinum group metal catalyst as component (d) may be used alone or in a combination of two or more.

The amount of component (d) used may be a catalytic amount necessary for the composition to cure and is not particularly limited. Typically, the catalyst may be used in an amount to give 0.1 to 1,000 ppm, desirably 0.5 to 500 ppm of platinum group metal element based on the weight of component (a).

Component (e) is a reaction regulator which serves to regulate the rate of reaction occurring between components (a) and (c) in the presence of component (d). Component (e) includes a number of well-known addition reaction regulators for use in ordinary addition reaction cure type silicone compositions. Exemplary reaction regulators include acetylene compounds such as 1-ethynyl-1-cyclohexanol and 3-butyn-1-ol, nitrogen compounds, organophosphorus compounds, sulfur compounds, oxime compounds, and organic chlorine compounds. The addition reaction regulator as component (e) may be used alone or in a combination of two or more.

The amount of component (e) used cannot be unequivocally determined since it varies with the amount of component (d) used, and may be an effective amount that enables to tailor the progress of hydrosilylation reaction to the desired rate of reaction. Typically, the amount of component (e) is about 10 to about 50,000 ppm based on the weight of component (a). Less amounts of component (e) may fail to gain a pot life whereas excessive amounts may retard the composition from curing.

Component (f) is a silicone resin which is added to impart tack to the cured product. Typically component (f) is a copolymer of $R^1{}_3SiO_{1/2}$ units (known as M units) and $SiO_{4/2}$ units (known as Q units) wherein the molar ratio of M units to Q units, M/Q, is preferably in the range between 0.5 and 1.5, more preferably between 0.6 and 1.4, and even more preferably between 0.7 and 1.3. If M/Q is less than 0.5 or more than 1.5, then the desired tack may not be achieved.

Herein $R^1$ in M units is a substituted or unsubstituted monovalent hydrocarbon radical free of aliphatic unsaturation, examples of which are those of 1 to 10 carbon atoms, and preferably 1 to 6 carbon atoms, including alkyl radicals such as methyl, ethyl, propyl, isopropyl, butyl, isobutyl, tert-butyl, pentyl, neopentyl, hexyl, heptyl, octyl, nonyl, decyl and dodecyl, cycloalkyl radicals such as cyclopentyl, cyclohexyl and cycloheptyl, aryl radicals such as phenyl, tolyl, xylyl, naphthyl and biphenylyl, aralkyl radicals such as benzyl, phenylethyl, phenylpropyl and methylbenzyl, and substituted forms of the foregoing in which some or all carbon-bonded hydrogen atoms are substituted by halogen atoms such as fluorine, chlorine and bromine, cyano radicals or the like, e.g., chloromethyl, 2-bromoethyl, 3-chloropropyl, 3,3,3-trifluoropropyl, chlorophenyl, fluorophenyl, cyanoethyl, and 3,3,4,4,5,5,6,6,6-nonafluorohexyl. Of these, preference is given to substituted or unsubstituted $C_1$-$C_3$ alkyl radicals such as methyl, ethyl, propyl, chloromethyl, bromoethyl, 3,3,3-trifluoropropyl, and cyanoethyl, and substituted or unsubstituted phenyl radicals such as phenyl, chlorophenyl and fluorophenyl. All $R^1$ may be identical or different. Most often, methyl is selected for all $R^1$ for several reasons including cost, availability, chemical stability and environmental load unless special properties like solvent resistance are required.

Component (f) is added in an amount of 50 to 500 parts, preferably 60 to 350 parts, and more preferably 70 to 200 parts by volume per 100 parts by volume of component (a). If the amount of component (f) is less than 50 parts by volume or more than 500 parts by volume, the desired tack is not achievable.

Although component (f) itself is a solid or viscous liquid at room temperature, it may be used as a solution in a solvent. On use of the solution, the amount of component (f) added is calculated from the amount excluding the solvent.

In the composition, a surface treating agent or wetter may be incorporated as component (g) for the purposes of hydrophobic treatment of heat conductive filler (b) to render it more wettable to organopolysiloxane (a) for thereby achieving more uniform dispersion of filler (b) in the matrix of organopolysiloxane (a).

(g-1) Alkoxysilane

One exemplary component (g) used herein is (g-1) an alkoxysilane compound having the general formula (1):

(1)

wherein $R^2$ is each independently $C_6$-$C_{15}$ alkyl, $R^3$ is each independently a substituted or unsubstituted, monovalent $C_1$-$C_8$ hydrocarbon radical, $R^4$ is each independently $C_1$-$C_6$ alkyl, "a" is an integer of 1 to 3, "b" is an integer of 0 to 2, and a+b is an integer of 1 to 3.

In formula (1), exemplary alkyl radicals represented by $R^2$ include hexyl, octyl, nonyl, decyl, dodecyl, and tetradecyl. When the alkyl radical represented by $R^2$ has 6 to 15 carbon atoms, component (b) is fully improved in wetting so that the composition is easier to handle and work and has better low-temperature characteristics.

Exemplary substituted or unsubstituted, monovalent hydrocarbon radicals represented by $R^3$ include alkyl radicals such as methyl, ethyl, propyl, hexyl and octyl; cycloalkyl radicals such as cyclopentyl and cyclohexyl; alkenyl radicals such as vinyl and allyl; aryl radicals such as phenyl and tolyl; aralkyl radicals such as 2-phenylethyl and 2-methyl-2-phenylethyl; and halogenated hydrocarbon radicals such as 3,3,3-trifluoropropyl, 2-(nonafluorobutyl)ethyl, 2-(heptadecafluorooctyl)ethyl and p-chlorophenyl. Inter alia, methyl and ethyl are preferred.

Exemplary alkyl radicals represented by $R^4$ include methyl, ethyl, propyl, butyl, pentyl, and hexyl. Inter alia, methyl and ethyl are preferred.

Illustrative preferred examples of component (g-1) are given below.

$C_6H_{13}Si(OCH_3)_3$, $C_{10}H_{21}Si(OCH_3)_3$, $C_{12}H_{25}Si(OCH_3)_3$,
$C_{12}H_{25}Si(OC_2H_5)_3$, $C_{10}H_{21}Si(CH_3)(OCH_3)_2$, $C_{10}H_{21}Si(C_6H_5)(OCH_3)_2$,
$C_{10}H_{21}Si(CH_3)(OC_2H_5)_2$, $C_{10}H_{21}Si(CH=CH_2)(OCH_3)_2$,
$C_{10}H_{21}Si(CH_2CH_2CF_3)(OCH_3)_2$

Component (g-1) may be used alone or in a combination of two or more. Component (g-1) is preferably used in an amount of 0.01 to 50 parts, more preferably 0.1 to 30 parts by volume per 100 parts by volume of component (a). Use of excessive amounts of component (g-1) is uneconomical due to no further increase of wetter effect and may raise the problem that because of its volatility, the composition or cured product thereof will become gradually harder when it is allowed to stand in an open system.

(g-2) Dimethylpolysiloxane

Besides component (g-1), component (g) used herein also includes (g-2) a dimethylpolysiloxane capped with a trialkoxysilyl radical at one end of the molecular chain, having the general formula (2):

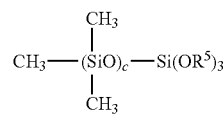

(2)

wherein $R^5$ is each independently $C_1$-$C_6$ alkyl, and "c" is an integer of 5 to 100.

In formula (2), examples of the alkyl radicals represented by $R^5$ are the same as the alkyl radicals represented by $R^4$ in formula (1).

Illustrative preferred examples of component (g-2) are given below.

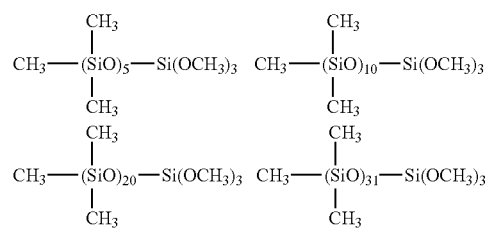

Component (g-2) may be used alone or in a combination of two or more. Component (g-2) is preferably used in an amount of 0.01 to 50 parts, more preferably 0.1 to 30 parts by volume per 100 parts by volume of component (a). Excessive amounts of component (g-2) tend to compromise the heat resistance and moisture resistance of the resultant cured product.

It is acceptable to use components (g-1) and (g-2) in combination as the surface treating agent (g). In this case, the total amount of component (g) blended is preferably 0.02 to 50 parts by volume per 100 parts by volume of component (a).

In the heat conductive composition, an organopolysiloxane of the average compositional formula (3):

(3)

wherein $R^6$ is each independently a monovalent $C_1$-$C_{18}$ hydrocarbon radical, and "d" is a number of 1.8 to 2.2, having a kinematic viscosity of 10 to 100,000 mm$^2$/s at 25° C. may be added as component (h), if desired, for the purpose of imparting, for example, an ability to regulate the viscosity of the composition. Component (h) may be used alone or in a combination of two or more.

In formula (3), $R^6$ is independently a substituted or unsubstituted monovalent hydrocarbon radicals of 1 to 18 carbon atoms. Examples of $R^6$ include alkyl radicals such as methyl, ethyl, propyl, hexyl, octyl, decyl, dodecyl, tetradecyl, hexadecyl, and octadecyl; cycloalkyl radicals such as cyclopentyl and cyclohexyl; alkenyl radicals such as vinyl and allyl; aryl radicals such as phenyl and tolyl; aralkyl radicals such as 2-phenylethyl and 2-methyl-2-phenylethyl; and halogenated hydrocarbon radicals such as 3,3,3-trifluoropropyl, 2-(perfluorobutyl)ethyl, 2-(perfluorooctyl)ethyl and p-chlorophenyl. Inter alia, methyl, phenyl and $C_6$-$C_{18}$ alkyl radicals are preferred.

From the standpoint of the desired viscosity, d is preferably a number of 1.8 to 2.2, and more preferably a number of 1.9 to 2.1.

The organopolysiloxane should preferably have a kinematic viscosity at 25° C. of 10 to 100,000 mm²/s and more preferably 100 to 10,000 mm²/s. A kinematic viscosity of lower than 10 mm²/s may lead to a likelihood of oil bleeding. A kinematic viscosity of higher than 100,000 mm²/s may lead to a heat conductive composition which is less flowable.

Illustrative examples of component (h) are given below.

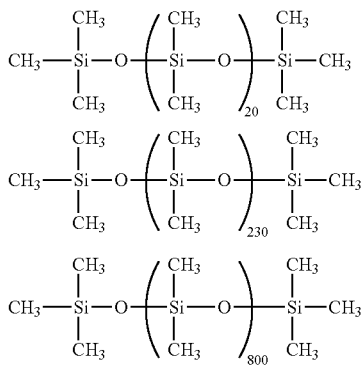

If used, the amount of component (h) added is not limited, and may be sufficient to achieve the desired effect. Preferably the amount of component (h) added is up to 100 parts, and more preferably up to 50 parts by volume per 100 parts by volume of component (a). If used, component (h) is preferably added in an amount of at least 1 part by volume. As long as the amount of component (h) added is in this range, the heat conductive composition prior to curing is likely to maintain a satisfactory level of fluidity and workability and easy to fill it with the heat conductive filler (b).

To the composition, additives, fillers or other components which are commonly used in the art may be further added as optional components insofar as they do not compromise the objects of the invention. Specifically, fluorine-modified silicone surfactants, colorants such as carbon black, titanium dioxide and red iron oxide, and flame retardants including metal oxides such as iron oxide, titanium oxide and cerium oxide, and metal hydroxides may be added. Also, finely divided silica such as precipitated silica or fired silica, thixotropic agents or the like may be added as anti-settling agents for the heat conductive filler.

The heat conductive composition may be prepared by intimately mixing the foregoing components.

Method of Preparing Heat Conductive Cured Product

A heat conductive cured product can be prepared by applying the composition of intimately mixed components as a thin film onto a substrate which has been treated to have a silicone pressure-sensitive adhesive releasable surface, and curing the coating.

Substrate

The substrate onto which the uncured heat conductive silicone composition is to be applied is typically a paper sheet or PET film which has been treated to have a silicone pressure-sensitive adhesive releasable surface. Typical of the surface release agent used herein are modified silicones having fluorine-substituted radicals such as perfluoroalkyl radicals or perfluoropolyether radicals on the main chain.

The perfluoropolyether radicals have the following formulae (4) to (6).

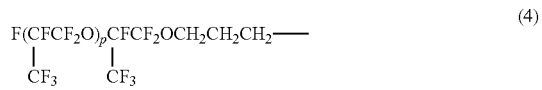

(p = 1 to 5)

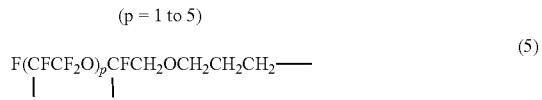

(p = 1 to 5)

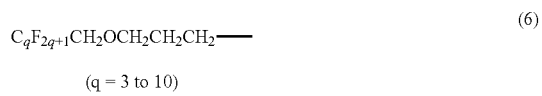

(q = 3 to 10)

Examples of the modified silicones having fluorinated substituent radicals include X-70-201 and X-70-258 from Shin-Etsu Chemical Co., Ltd.

The surface treatment of the substrate with the surface release agent is not particularly limited, and may be carried out by well-known techniques.

In applying the composition onto a substrate, a suitable applicator such as a bar coater, knife coater, comma coater or spin coater may be used to apply the liquid composition onto the substrate. The application technique is not limited thereto.

Prior to applying the composition, a solvent such as toluene may be added to the composition for viscosity adjustment.

The coating or cured product preferably has a thickness of 20 to 1,000 μm and more preferably 50 to 500 μm. If the coating thickness is less than 20 μm, it may lack ease of handling and tack. If the coating thickness is more than 1,000 μm, the desired heat transfer may not be obtained.

Heating conditions after application are not particularly limited as long as heating reaches a temperature at which the solvent, if used, volatilizes off and a reaction between components (a) and (c) takes place. From the productivity aspect, the temperature is desirably 50 to 150° C., and more desirably 60 to 150° C. The cure reaction is slow at temperatures lower than 50° C., detracting from productivity, whereas the film used as the substrate may deform at temperatures above 150° C. The curing time is usually 0.5 to 30 minutes, and preferably 1 to 20 minutes. Either heating at a constant temperature, or step-up or ramp-up heating at varying temperatures may be used.

Heat Conductivity

The heat conductive cured product should preferably have a heat conductivity of at least 1.5 W/m-K and more preferably at least 2.0 W/m-K as measured at 25° C. by laser flash analysis. Even when applied to a heat-generating part capable of producing a great amount of heat release, the composition having a heat conductivity equal to or more than 1.5 W/m-K can transfer and dissipate the heat of the heat-generating part to a heat-dissipating member. It is noted that the measurement of heat conductivity by laser flash analysis may be carried out according to ASTM E1461.

After the heat conductive cured product is completed, a film which has been treated to have a releasable surface like the substrate film and serves as a separator film is attached to the surface of the cured product remote from the substrate to give an assembly which is convenient for manipulations including transportation and length cutting. The substrate film and the separator film may be provided with different peeling force by changing the amount and type of the release agent and the type of film used in the separator film from those of the substrate film.

On use, the separator film or substrate film is peeled from the assembly, the heat conductive cured product is attached to a heat-generating component or heat-dissipating member, and then the remaining film is peeled. Even though the cured product is a thin film, it can be readily attached in place and provide for effective heat transfer.

EXAMPLE

Examples and Comparative Examples are given below by way of illustration of the invention and not by way of limitation. In Examples, the kinematic viscosity is measured by an Ostwald viscometer, and the average particle size is a volume basis accumulative average particle size (or median diameter) as measured by a particle size analyzer Microtrac® MT3300EX (Nikkiso Co., Ltd.).

Components (A) to (F) used in Examples and Comparative Examples are identified below.

Component (a)
(A-1) dimethylvinylsiloxy-terminated dimethylpolysiloxane having a kinematic viscosity of 600 mm$^2$/s at 25° C.
(A-2) dimethylvinylsiloxy-terminated dimethylpolysiloxane having a kinematic viscosity of 30,000 mm$^2$/s at 25° C.

Component (b)
(B-1) aluminum powder with an average particle size of 10.7 μm (theoretical specific density 2.70)
(B-2) aluminum powder with an average particle size of 30.1 μm (theoretical specific density 2.70)
(B-3) aluminum powder with an average particle size of 1.5 μm (theoretical specific density 2.70)
(B-4) alumina powder with an average particle size of 10.6 μm (theoretical specific density 3.98)
(B-5) alumina powder with an average particle size of 1.0 μm (theoretical specific density 3.98)
(B-6) zinc oxide powder with an average particle size of 0.7 μm (theoretical specific density 5.67)

Component (c)
(C-1) organohydrogenpolysiloxane of the structural formula:

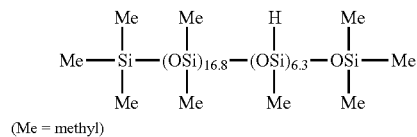

(Me = methyl)

(C-2) organohydrogenpolysiloxane of the structural formula:

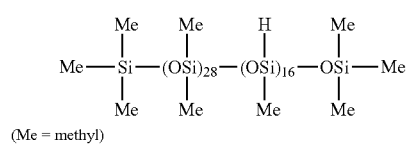

(Me = methyl)

Component (d)
(D-1) a solution of platinum-divinyltetramethyldisiloxane complex in dimethylvinylsilyl-terminated dimethylpolysiloxane having a kinematic viscosity of 600 mm$^2$/s at 25° C. (platinum atom content: 1 wt %)

Component (e)
(E-1) a 50 wt % toluene solution of 1-ethynyl-1-cyclohexanol

Component (f)
(F-1) a toluene solution of a silicone resin consisting of $(CH_3)_3 SiO_{1/2}$ units (M units) and $SiO_{4/2}$ units (Q units) in a molar ratio M/Q of 1.15 (nonvolatile content 60%)

Component (g)
(G-1) organosilane of the structural formula: $C_{12}H_{25}Si(OC_2H_5)_3$
(G-2) dimethylpolysiloxane capped with trimethoxysilyl at one end of the molecular chain having the structural formula:

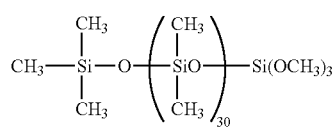

Component (h)
(H-1) dimethylpolysiloxane of the structural formula:

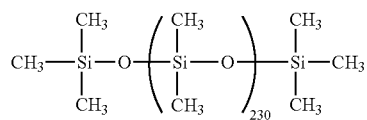

having a kinematic viscosity of 600 mm$^2$/s at 25° C.

Substrate
(K-1) PET film of 100 μm thick having agent X-70-201 (Shin-Etsu Chemical Co., Ltd.) coated thereon to a buildup of 1.0 g/m$^2$
(K-2) untreated PET film of 100 μm thick Examples 1-3 and Comparative Examples 1-3

Preparation of Heat Conductive Composition

Compositions were prepared by using the compounds in Table 1 in the amounts in Table 1 and working them as follows.

A planetary mixer having an internal volume of 700 mL (Primix Corp., trade name T. K. Hivis Mix) was charged with components (a) and (b), and optionally components (g) and (h) whereupon they were mixed for 60 minutes. Then components (d) and (e) were added to the mixture, which was intimately mixed. Finally components (c) and (f) were added to the mixture, which was intimately mixed to yield a heat conductive composition.

Preparation of Heat Conductive Cured Product

The uncured heat conductive composition which had been intimately mixed was applied to a substrate and cured under the conditions shown in Table 1, obtaining a heat conductive cured product. The heat conductive cured products (samples) thus obtained were examined and compared with respect to peeling from substrate, handling after peeling, bleed, heat conductivity and thermal resistance.

Peeling

"Peeling" was examined by a manual touch test. The operator evaluated a peeling force required to manually peel the heat conductive cured product (0.1 mm thick) from the substrate film. The results are shown in Table 1.

Handling After Peeling

"Handling after peeling" was rated by examining how the heat conductive cured product (0.1 mm thick) after peeling could be manually handled while visually inspecting the shape thereof. The results are shown in Table 1.

Bleed

"Bleeding" was examined by cutting the 0.1-mm thick sample together with the substrate into a piece of 20 mm square, resting the piece on wood-free paper with the heat conductive cured product layer facing the paper, placing a weight of 100 g thereon for pressure contact, and allowing to stand one day. The degree of migration of oil to the paper was visually inspected. The results are shown in Table 1.

Heat Conductivity

For heat conductivity measurement, heat conductive cured product samples having the same composition, but different thickness (100 μm, 125 μm, 150 μm, 200 μm) were prepared. The heat conductive cured product sample was rested on the entire surface of a standard aluminum disc (purity 99.9%, diameter ~12.7 mm, thickness ~1.0 mm), and an identical standard aluminum disc was laid thereon. The resulting structure was fastened by clamps to apply a pressure of about 175.5 kPa (1.80 kgf/cm$^2$), completing a three-layer structure.

The thickness of the heat conductive cured product was computed by measuring the thickness of the test assembly thus completed and subtracting the known thickness of standard aluminum disc therefrom. For the thickness measurement of the test assembly, a micrometer model M820-25VA (Mitsutoyo Co., Ltd.) was used. Using the test assembly, the thermal resistance (cm$^2$-K/W) of the heat conductive cured product was measured by a thermal resistance tester (xenon flash analyzer LFA447 NanoFlash, Netzsch). A primary linear approximate line of thermal resistance versus thickness was drawn, with thickness on X axis and thermal resistance on Y axis. Heat conductivity was given by the reciprocal of gradient of the line. The values of heat conductivity are shown in Table 1.

Application to Heat-Generating/Dissipating Assembly

The heat conductive cured product (0.1 mm thick) obtained above was rested on the surface of a simulative CPU of 2 cm×2 cm. A heat-dissipating member was laid thereon. This was pressed into a heat-generating/dissipating assembly in which the simulative CPU and the heat-dissipating member were joined via the heat conductive layer. The simulative CPU was supplied with power whereupon the heat-generating temperature of the CPU became steady at about 100° C. The assembly operated at a steady level of heat transfer and dissipation over a long term, and a failure of the heat-generating component due to over-heat accumulation did not occur. It was thus ascertained that the use of the heat conductive cured product is effective in improving the reliability of a heat-generating/dissipating assembly such as a semiconductor device.

FIG. 1 is a schematic cross-sectional elevation view of a heat-generating/dissipating assembly into which the heat conductive cured product is incorporated. The assembly includes a heat conductive cured product 1, an IC package 2, a printed circuit board 3, a heat-dissipating member 4, and a clamp 5.

TABLE 1

| | | | | | Composition | | | | | |
| --- | --- | --- | --- | --- | --- | --- | --- | --- | --- | --- |
| | | | | | Example | | | Comparative Example | | |
| | | | | | 1 | 2 | 3 | 1 | 2 | 3 |
| Formulation | Parts by volume | (a) | A-1 | | 100 | — | 100 | — | 100 | — |
| | | | A-2 | | — | 100 | — | 100 | — | 100 |
| | | (b) | B-1 | | — | 193 | 100 | 80 | 800 | 215 |
| | | | B-2 | | 159 | — | 150 | — | — | — |
| | | | B-3 | | 159 | 193 | 200 | — | — | — |
| | | | B-4 | | 78 | — | — | 260 | — | — |
| | | | B-5 | | 30 | — | — | 65 | 250 | 55 |
| | | | B-6 | | — | — | 100 | — | — | — |
| | | (c) | C-1 | | 8.6 | — | 8.6 | 2.9 | 8.6 | 2.9 |
| | | | C-2 | | — | 2.1 | — | — | — | — |
| | | (f) | F-1*[1] | | 300 (180) | 300 (180) | 300 (180) | 300 (180) | 300 (180) | 300 (180) |
| | | (g) | G-1 | | — | — | 3 | — | — | — |
| | | | G-2 | | 15 | 15 | 10 | 15 | 15 | 15 |
| | | (h) | H-1 | | — | — | 2 | — | — | — |
| | Concentration (ppm)*[2] | (d) | D-1 | | 7000 (70) | 7000 (70) | 7000 (70) | 7000 (70) | 7000 (70) | 7000 (70) |
| | | (e) | E-1 | | 3000 (1500) | 3000 (1500) | 3000 (1500) | 3000 (1500) | 3000 (1500) | 3000 (1500) |
| SiH/Vi*[3] | | | | | 2.2 | 3.2 | 3.1 | 3.1 | 3.1 | 2.2 |
| Substrate | | | | | K-1 | K-1 | K-1 | K-1 | K-1 | K-2 |
| Curing conditions | | | | | 80° C./10 min oven heating | 80° C./10 min oven heating | 80° C./10 min oven heating | 80° C./10 min oven heating | 80° C./10 min oven heating | 80° C./10 min oven heating |
| Peeling | | | | | Good | Good | Good | Good | very brittle, difficult to handle | hard peeling, cured product deformed |
| Handling after peeling | | | | | Good | Good | Good | Good | | |
| Bleeding | | | | | substantially nil | substantially nil | substantially nil | substantially nil | | |
| Heat conductivity (W/m-K) | | | | | 2.3 | 2.0 | 2.3 | 1.4 | | |

*[1]The numerical value in parentheses is parts by volume of resin in component (f) relative to the volume of component (a).
*[2]The concentrations of components (d) and (e) are the concentrations of components (D-1) and (E-1) relative to the weight of component (a), respectively. The numerical values in parentheses are the concentration of platinum atom in component (D-1) relative to the weight of component (a) and the concentration of 1-ethynyl-1-cyclohexanol in component (E-1) relative to the weight of component (a).
*[3]"SiH/Vi" indicates the number of SiH radicals (i.e., silicon-bonded hydrogen atoms) in component (b) per vinyl radical in component (a).

The invention claimed is:

1. A heat conductive cured product having a substrate film and a separator film, said heat conductive cured product obtained by a processing comprising applying a heat conductive composition as a thin film to the substrate film which has been treated to have a silicone pressure-sensitive adhesive releasable surface with a modified silicone having a fluorinated substituent radical on the main chain selected from the group consisting of a perfluoroalkyl radical and a perfluoropolyether radical, and curing the composition, and the separator film which has been treated to have a releasable surface being attached to the surface of the heat conductive cured product remote from the substrate film, and said composition comprising, (a) 100 parts by volume of an organopolysiloxane having alkenyl radicals, (b) 50 to 1,000 parts by volume of a heat conductive filler, the filler comprising at least 30% by volume of aluminum powder based on the total volume of the filler, (c) an organohydrogenpolysiloxane in an amount to give a molar ratio of silicon-bonded hydrogen atoms in component (c) to alkenyl radicals in component (a) between 0.5 and 5.0, (d) a catalytic amount of a platinum group metal catalyst, (e) an effective amount of a reaction regulator, and (f) 50 to 500 parts by volume of a silicone resin comprising $R^1_3SiO_{1/2}$ units and $SiO_{4/2}$ units wherein $R^1$ is a substituted or unsubstituted monovalent hydrocarbon radical free of aliphatic unsaturation, a molar ratio of $R^1_3SiO_{1/2}$ units to $SiO_{4/2}$ units being between 0.5 and 1.5.

2. The heat conductive cured product of claim 1 wherein said heat conductive composition further comprises (g-1) 0.01 to 50 parts by volume of an alkoxysilane compound having the general formula (1):

wherein $R^2$ is each independently $C_6$-$C_{15}$ alkyl, $R^3$ is each independently a substituted or unsubstituted, monovalent $C_1$-$C_8$ hydrocarbon radical, $R^4$ is each independently $C_1$-$C_6$ alkyl, "a" is an integer of 1 to 3, "b" is an integer of 0 to 2, a+b is an integer of 1 to 3, and/or (g-2) 0.01 to 50 parts by volume of a dimethylpolysiloxane capped with a trialkoxysilyl radical at one end of the molecular chain, having the general formula (2):

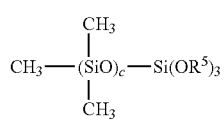

wherein $R^5$ is each independently $C_1$-$C_6$ alkyl, and "c" is an integer of 5 to 100.

3. The heat conductive cured product of claim 1 wherein said heat conductive composition further comprises (h) an organopolysiloxane having the general formula (3):

wherein $R^6$ is each independently a monovalent $C_1$-$C_{18}$ hydrocarbon radical, and "d" is a number of 1.8 to 2.2, said organopolysiloxane having a kinematic viscosity of 10 to 100,000 mm²/s at 25° C.

4. The heat conductive cured product of claim 1 wherein the cured product has a thickness of 20 to 1,000 μm.

5. The heat conductive cured product of claim 1, having a heat conductivity of at least 1.5 W/m-K as measured at 25° C. by laser flash analysis.

6. A method for preparing a heat conductive cured product, comprising mixing components (a) to (f) to form a composition, applying the composition as a thin film to a substrate film which has been surface treated to have a silicone pressure-sensitive adhesive releasable surface with a modified silicone having a fluorinated substituent radical on the main chain selected from the group consisting of a perfluoroalkyl radical and a perfluoropolyether radical, and curing the composition, and attaching a separate film which has been treated to have a releasable surface being attached to the surface of the cured product remote from the substrate film, said components (a) to (f) being:

(a) 100 parts by volume of an organopolysiloxane having alkenyl radicals, (b) 50 to 1,000 parts by volume of a heat conductive filler, the filler comprising at least 30% by volume of aluminum powder based on the total volume of the filler, (c) an organohydrogenpolysiloxane in an amount to give a molar ratio of silicon-bonded hydrogen atoms in component (c) to alkenyl radicals in component (a) between 0.5 and 5.0, (d) a catalytic amount of a platinum group metal catalyst, (e) an effective amount of a reaction regulator, and (f) 50 to 500 parts by volume of a silicone resin comprising $R^1_3SiO_{1/2}$ units and $SiO_{4/2}$ units wherein $R^1$ is a substituted or unsubstituted monovalent hydrocarbon radical free of aliphatic unsaturation, a molar ratio of $R^1_3SiO_{1/2}$ units to $SiO_{4/2}$ units being between 0.5 and 1.5.

7. The method for preparing a heat conductive cured product of claim 6, wherein said heat conductive composition further comprises (g-1) 0.01 to 50 parts by volume of an alkoxysilane compound having the general formula (1):

wherein $R^2$ is each independently $C_6$-$C_{15}$ alkyl, $R^3$ is each independently a substituted or unsubstituted, monovalent $C_1$-$C_8$ hydrocarbon radical, $R^4$ is each independently $C_1$-$C_6$ alkyl, "a" is an integer of 1 to 3, "b" is an integer of 0 to 2, a+b is an integer of 1 to 3, and/or (g-2) 0.01 to 50 parts by volume of a dimethylpolysiloxane capped with a trialkoxysilyl radical at one end of the molecular chain, having the general formula (2):

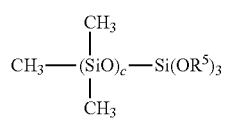

wherein $R^5$ is each independently $C_1$-$C_6$ alkyl, and "c" is an integer of 5 to 100.

8. The method for preparing a heat conductive cured product of claim 6, wherein said heat conductive composition further comprises (h) an organopolysiloxane having the general formula (3):

wherein $R^6$ is each independently a monovalent $C_1$-$C_{18}$ hydrocarbon radical, and "d" is a number of 1.8 to 2.2, said organopolysiloxane having a kinematic viscosity of 10 to 100,000 mm²/s at 25° C.

9. The method for preparing a heat conductive cured product of claim 6, wherein the cured product has a thickness of 20 to 1,000 µm.

10. The method for preparing a heat conductive cured product of claim 6, wherein the cured product has a heat conductivity of at least 1.5 W/m-K as measured at 25° C. by laser flash analysis.

11. The heat conductive cured product of claim 1, wherein the organopolysiloxane is at least one selected from the group consisting of dimethylvinylsiloxy-terminated polydimethylsiloxane, methyldivinylsiloxy-terminated polydimethylsiloxane, and dimethylvinylsiloxy-terminated dimethylsiloxane-methylphenylsiloxane copolymers.

12. The method for preparing a heat conductive cured product of claim 6, wherein the organopolysiloxane is at least one selected from the group consisting of dimethylvinylsiloxy-terminated polydimethylsiloxane, methyldivinylsiloxy-terminated polydimethylsiloxane, and dimethylvinylsiloxy-terminated dimethylsiloxane-methylphenylsiloxane copolymers.

13. The heat conductive cured product of claim 1, wherein the organohydrogenpolysiloxane is at least one selected from the group consisting of trimethylsiloxy-terminated methylhydrogenpolysiloxane, trimethylsiloxy-terminated dimethylsiloxane-methylhydrogensiloxane copolymers, trimethylsiloxy-terminated dimethylsiloxane-methylhydrogensiloxane-methylphenylsiloxane copolymers, dimethylhydrogensiloxy-terminated dimethylpolysiloxane, dimethylhydrogensiloxy-terminated dimethylsiloxane-methylhydrogensiloxane copolymers, dimethylhydrogensiloxy-terminated dimethylsiloxane-methylphenylsiloxane copolymers, and dimethylhydrogensiloxy-terminated methylphenylpolysiloxane.

14. The method for preparing a heat conductive cured product of claim 6, wherein the organohydrogenpolysiloxane is at least one selected from the group consisting of trimethylsiloxy-terminated methylhydrogenpolysiloxane, trimethylsiloxy-terminated dimethylsiloxane-methylhydrogensiloxane copolymers, trimethylsiloxy-terminated dimethylsiloxane-methylhydrogensiloxane-methylphenylsiloxane copolymers, dimethylhydrogensiloxy-terminated dimethylpolysiloxane, dimethylhydrogensiloxy-terminated dimethylsiloxane-methylhydrogensiloxane copolymers, dimethylhydrogensiloxy-terminated dimethylsiloxane-methylphenylsiloxane copolymers, and dimethylhydrogensiloxy-terminated methylphenylpolysiloxane.

15. The heat conductive cured product of claim 1, wherein the aluminum powder has an average particle size of 0.1 to 100 µm.

16. The method for preparing a heat conductive cured product of claim 6, wherein the aluminum powder has an average particle size of 0.1 to 100 µm.

* * * * *